United States Patent
Kwan et al.

(10) Patent No.: US 9,215,174 B2
(45) Date of Patent: Dec. 15, 2015

(54) OVERSUBSCRIPTION BUFFER MANAGEMENT

(71) Applicant: Broadcom Corporation, Irvine, CA (US)

(72) Inventors: Bruce Kwan, Sunnyvale, CA (US); Brad Matthews, San Jose, CA (US)

(73) Assignee: BROADCOM CORPORATION, Irvine, CA (US)

(*) Notice: Subject to any disclaimer, the term of this patent is extended or adjusted under 35 U.S.C. 154(b) by 67 days.

(21) Appl. No.: 13/802,480

(22) Filed: Mar. 13, 2013

(65) Prior Publication Data

US 2014/0112128 A1    Apr. 24, 2014

Related U.S. Application Data

(60) Provisional application No. 61/715,456, filed on Oct. 18, 2012.

(51) Int. Cl.
*H04L 12/801* (2013.01)
*H04L 12/825* (2013.01)
*H04L 12/835* (2013.01)

(52) U.S. Cl.
CPC ............ *H04L 47/12* (2013.01); *H04L 47/26* (2013.01); *H04L 47/30* (2013.01)

(58) Field of Classification Search
CPC ........................................ H04L 47/12
USPC .................. 370/229–232, 235, 237
See application file for complete search history.

(56) References Cited

U.S. PATENT DOCUMENTS

| 8,520,522 | B1* | 8/2013 | Goldman et al. | 370/235 |
|---|---|---|---|---|
| 2004/0148423 | A1* | 7/2004 | Key et al. | 709/235 |
| 2009/0122698 | A1* | 5/2009 | Lakshmikantha et al. | 370/229 |
| 2009/0268614 | A1* | 10/2009 | Tay et al. | 370/236 |
| 2012/0275301 | A1* | 11/2012 | Xiong | 370/230 |

* cited by examiner

*Primary Examiner* — Brandon Renner
*Assistant Examiner* — Sasha Cintron Pacheco
(74) *Attorney, Agent, or Firm* — Oblon, McClelland, Maier & Neustadt, L.L.P.

(57) ABSTRACT

Various methods and systems are provided for oversubscription buffer management. In one embodiment, among others, a method for oversubscription control determines a utilization level of an oversubscription buffer that is common to a plurality of ingress ports and initiates adjustment of an ingress packet rate of the oversubscription buffer in response to the utilization level. In another embodiment, a method determines an occupancy level of a virtual oversubscription buffer associated with an oversubscription buffer and initiates adjustment of an ingress packet rate in response to the occupancy level. In another embodiment, a rack switch includes an oversubscription buffer configured to receive packets from a plurality of ingress ports and provide the received packets for processing by the rack switch and a packet flow control configured to monitor an occupancy level of the oversubscription buffer and to initiate adjustment of an ingress packet rate in response to the occupancy level.

19 Claims, 8 Drawing Sheets

OVERSUBSCRIPTION BUFFER MANAGEMENT

CROSS REFERENCE TO RELATED APPLICATIONS

This application claims priority to co-pending U.S. provisional application entitled "OVERSUBSRIPTION BUFFER MANAGEMENT" having Ser. No. 61/715,456, filed Oct. 18, 2012, which is hereby incorporated by reference in its entirety.

BACKGROUND

IT operations are an important aspect of most organizations. Many organizations use a data center including multiple racks or clusters of servers to provide network communication, application, and data storage capabilities. A top of rack (TOR) switch interfaces with the servers to control traffic with and/or between the servers. Oversubscription can occur when the TOR switch can receive packets or frames faster than it can process and supply the packets to the servers.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
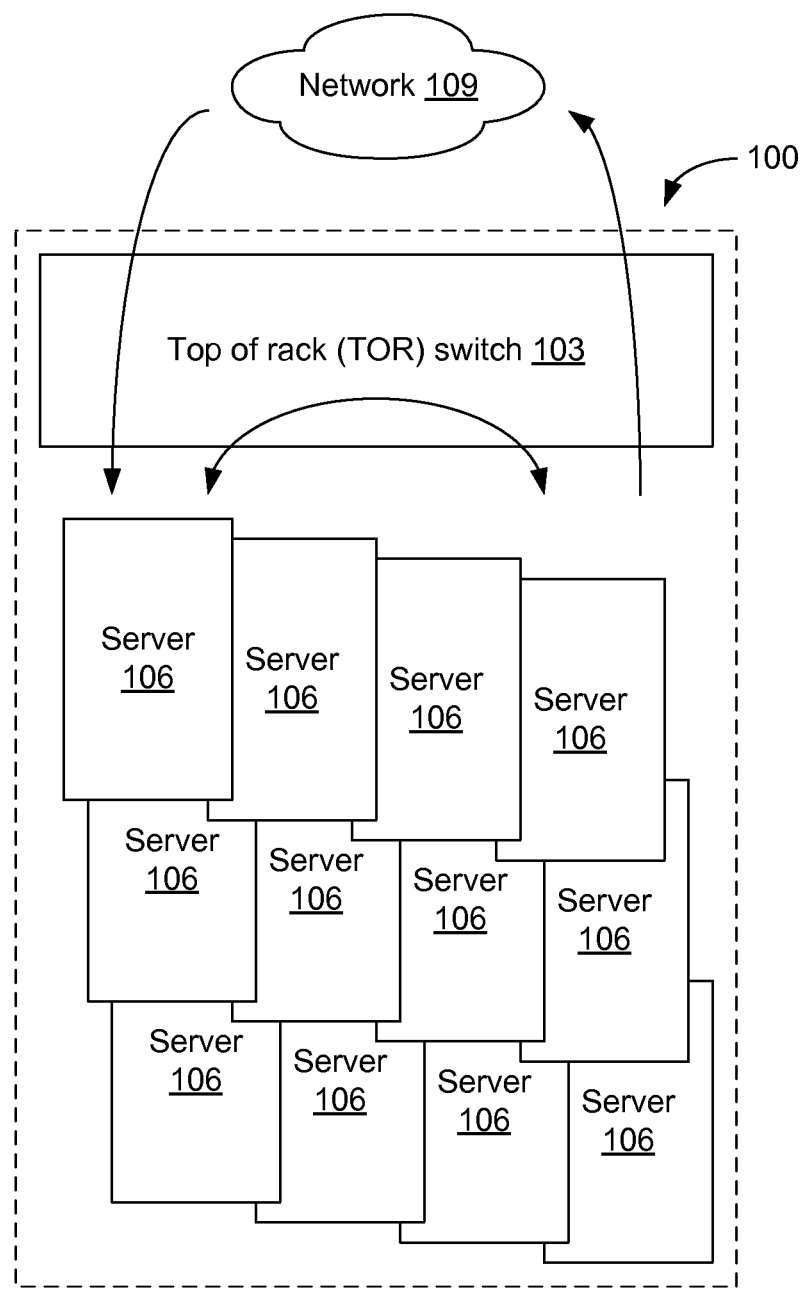
FIG. 1 is a graphical representation of an example of a rack including a top of rack (TOR) switch that interfaces with a cluster of servers in accordance with various embodiments of the present disclosure.

Disclosed herein are various embodiments of methods and systems related to oversubscription buffer management. Reference will now be made in detail to the description of the embodiments as illustrated in the drawings, wherein like reference numbers indicate like parts throughout the several views.

Referring to FIG. 1, shown is a graphical representation of an example of a rack 100 including a top of rack (TOR) switch 103 that interfaces with a cluster of servers 106 (e.g., 40 servers in the rack 100) to control traffic flow of the rack 100. The TOR switch 103 may include, e.g., 40 ingress ports with each configured to handle 10 gigabits per second (Gbps) and a full operational capability of 400 Gbps. In some cases, the TOR switch 103 may operate at a rate that is less than the full operational capability, which would result in oversubscription (i.e., core bandwidth is less than input/output (I/O) bandwidth). While the full line rate of a port may need to be readily available, the full capability of all ports is generally not utilized at the same time. For example, the TOR switch 103 may generally operate at about 30% of its full bandwidth with intermittent bursts of operation at much higher levels. This may allow the TOR switch 103 to operate at a lower internal frequency (e.g., 300 Gbps) to reduce power consumption.

Traffic to and/or from a network 109 in communication with the TOR switch 103 (referred to as North/South traffic) may be impacted by oversubscription. In addition, traffic between servers 106 of the cluster (referred to as East/West traffic) or between racks such as, e.g., search traffic, which can constitute a large fraction of the traffic through the TOR switch 103, may be latency sensitive. Oversubscription management and congestion control can be used to mitigate packet or frame loss and latency effects on the rack traffic.

Figure 2:
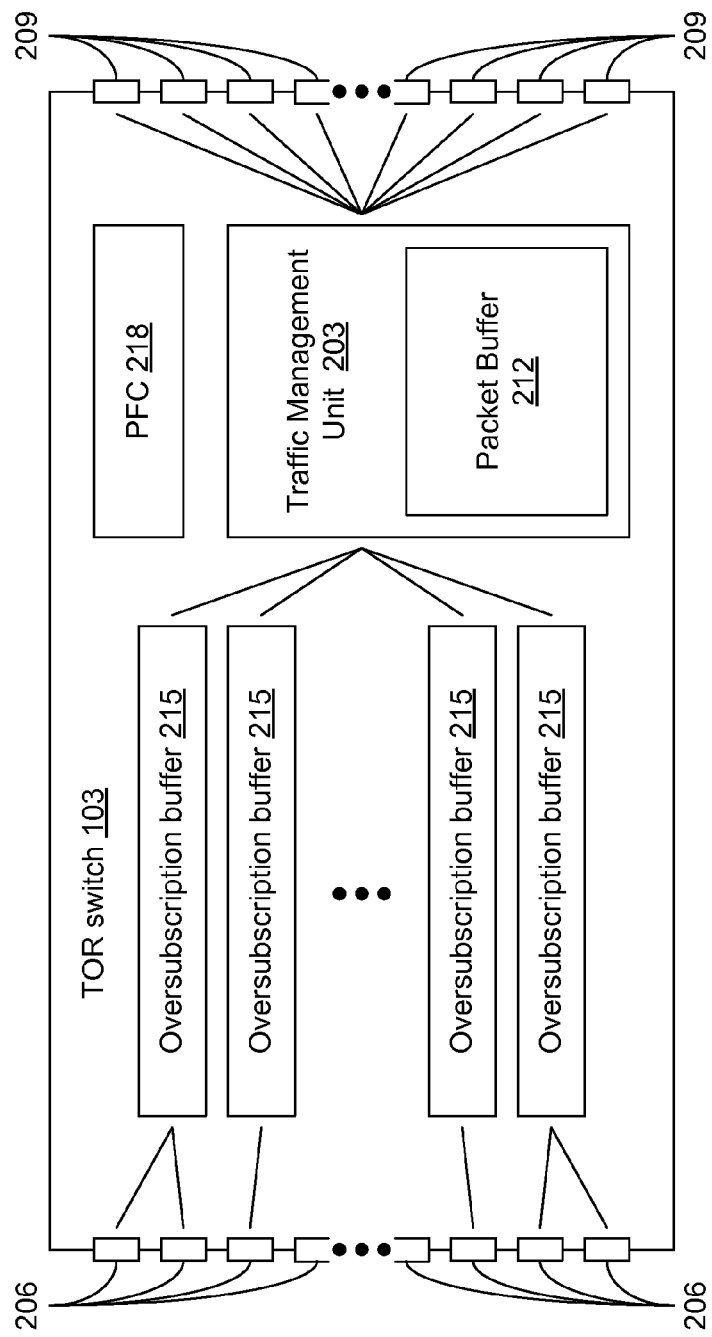
FIGS. 2, 3, 4A, 4B, and 5 are graphical representations of examples of a TOR switch of FIG. 1 in accordance with various embodiments of the present disclosure.
Figure 2:
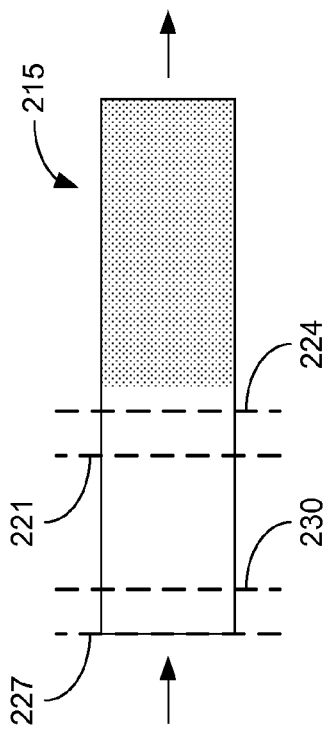

Referring next to FIG. 2, shown is a graphical representation of an example of the TOR switch 103 of FIG. 1. The TOR switch 103 includes a traffic (or memory) management unit 203 configured to control distribution of packets received through a plurality of ingress ports 206 to the servers 106 in the rack 100 (FIG. 1) through a plurality of egress ports 209. The traffic management unit 203 is configured to control traffic flow by receiving packets or frames through the ingress ports 206 and providing the packets or frames to the appropriate egress ports 209. The traffic management unit 203 can include a packet buffer 212 to absorb bursts in traffic flow through the traffic management unit 203. In the example of FIG. 2, the TOR switch 103 also includes one or more oversubscription buffers 215, which may receive packet flow from one or more of the ingress ports 206. Because of limitations in the buffer size, throughput may be improved by sharing an oversubscription buffer 215 between multiple ingress ports 206.

The TOR switch 103 can include a packet flow control (PFC) 218, which may be configured to monitor the occupancy (or utilization) level of the oversubscription buffers 215. The PFC 218 may initiate adjustment of the traffic flow (e.g., an ingress packet rate) to an oversubscription buffer 215 through one or more ingress ports 206 based upon the occupancy (or level of utilization) of the oversubscription buffer 215. In some embodiments, one or more rate control messages (RCMs) may be sent from the TOR switch 103 to one or more sources of the incoming packets (e.g., a link partner or a server 106) to adjust their packet transmission rate. In other embodiments, a congestion notification of one or more packets may be configured to indicate that congestion is present or being encountered. Examples of congestion notifications can include, but are not limited to, an explicit congestion notification (ECN), a forward ECN (FECN), and/or a quantized congestion notification (QCN).

For example, one or more sources may transmit packets to the TOR switch 103 at corresponding packet transmission rates. The packets are received through one or more ingress ports 206 of the TOR switch 103 and sent to the oversubscription buffer 215 associated with the ingress port 206, where they are provided to the traffic management unit 203 at a defined rate for processing and distribution through the egress ports 209. Where the ingress packet rate from the source(s) exceeds the processing rate of the traffic management unit 203, then the occupancy of the oversubscription buffer 215 increases over time.

If the occupancy (or utilization) level of the oversubscription buffer 215 equals and/or exceeds a predefined reduction threshold 221, then the PFC 218 may send a RCM to one or more source of the incoming packets to reduce the packet transmission rate. The RCM may include a field that includes the rate (e.g., packets per second or pps) at which the source (e.g., the link partner or a server 106) should transmit packets to the TOR switch 103. For instance, the RCM may instruct a port shaper of the link partner to reduce the packet transmission rate to a predefined oversubscription transmission rate. In other cases, the RCM may instruct the source of the packets to reduce the packet transmission rate. For example, the source may reduce the transmission rate below a defined rate limit included in the RCM. In other implementations, the source may reduce the transmission rate by a predefined amount (or percentage of the packet transmission rate) or by an amount or percentage included in the RCM.

In other implementations, the PFC 218 may cause the congestion notification (e.g., ECN, FECN, and/or QCN) marking in one or more packets that are subsequently provided to the oversubscription buffer 215 to be configured to indicate that congestion is present of being encountered. If the occupancy (or utilization) level of the oversubscription buffer 215 equals and/or exceeds the predefined reduction threshold 221, then the congestion notification marking of subsequent packets received by the oversubscription buffer 215 is modified it indicate the presence of congestion. The packets are then processed and distributed to their destination(s) (e.g., a link partner or a server 106) by the traffic management unit 203. The destination(s) may then provide an acknowledgement back to the source of the received packet, which can include an indication of the congestion notification. The source of the packet may then adjust its packet transmission rate in response to the congestion indication of the congestion notification. For instance, the source may reduce its packet transmission rate to a predefined oversubscription transmission rate or reduce the transmission rate by a predefined amount (or percentage of the packet transmission rate). Use of the congestion notification marking allows for adjustment of the ingress packet rate from the source(s) without adding additional messaging to the traffic flow.

If the ingress packet rate of the oversubscription buffer 215 falls below the processing rate of the traffic management unit 203, then the occupancy of the oversubscription buffer 215 will begin to decrease. When the occupancy (or utilization) level of the oversubscription buffer 215 equals and/or falls below a predefined restoration threshold 224, the PFC 218 may provide another RCM to the one or more sources of the incoming packets indicating that the packet transmission rate may be increased to, e.g., the previous packet transmission rate (or an initial packet rate). In other embodiments, the source may increase the transmission rate by a predefined amount (or percentage of the packet transmission rate) or an amount or percentage included in the RCM.

If the congestion notification (e.g., ECN, FECN, and/or QCN) marking is being used, the PFC 218 may configure the congestion notification marking in one or more packets subsequently provided to the oversubscription buffer 215 to indicate that congestion has been reduced or not present. If the occupancy (or utilization) level of the oversubscription buffer 215 equals and/or falls below the predefined restoration threshold 224, then the congestion notification marking of subsequent packets received by the oversubscription buffer 215 is modified it indicate the lack of (or reduction in) congestion. The packets are then processed and distributed to their destination(s) by the traffic management unit 203. The destination(s) may then provide an acknowledgement back to the source of the received packet, which can include an indication of the congestion notification. The source of the packet may then adjust its packet transmission rate in response to the congestion indication of the congestion notification. For instance, the source may increase its packet transmission rate to the previous transmission rate or increase the transmission rate by a predefined amount (or percentage of the packet transmission rate).

If the oversubscription buffer 215 receives packets from multiple sources, then the PFC 218 monitors the packet transmission rates for each source and/or the packet rate of each ingress port 206 associated with the oversubscription buffer. The PFC 218 may then send a RCM to one, some, or all of the sources based upon the occupancy of the shared oversubscription buffer 215. In some cases, the incoming packets may be associated with a pipeline and the RCM may be transmitted to all sources associated with the pipeline. In other cases, which source(s) the RCM is sent to may be based upon the packet transmission rates for each source. For example, the PFC 218 may send a RCM to the source with the highest packet transmission rate or to a combination of sources to reduce the packet transmission rates, and thus reduce the ingress packet rate of the oversubscription buffer 215.

In some implementations, a plurality of user defined reduction (and corresponding restoration) thresholds may be utilized to adjust the packet transmission rate from the source. The RCM may indicate different packet transmission rates for the source(s) based upon the occupancy (or utilization) level of the oversubscription buffer 215. If a congestion notification marking is used, then different codes may be used to indicate different levels of congestion. The source would then adjust its packet transmission rate based upon the congestion notification of the transmitted acknowledgements. This would allow for incremental adjustment of the packet transmission rate.

If the occupancy (or level of utilization) of the oversubscription buffer 215 continues to increase after reducing the packet transmission rate, then another RCM may be provided by the PFC 218 to pause packet transmission from the source (or sources) when a predefined upper limit threshold 227 is reached and/or exceeded. In the example of FIG. 2, the upper limit threshold is defined at the end of the oversubscription buffer 215. In other implementations, the upper limit threshold 227 may be set at a lower level to account for packets that are sent before packet transmission is paused by the source. The PFC 218 may send a RCM to the source (or sources) to resume transmission of the packets when the occupancy level of the oversubscription buffer 215 equals and/or falls below the predefined restoration threshold 224. In other implementations, a separate resumption threshold 230 may be set below the upper limit threshold 227 such that the PFC 218 sends a RCM to resume transmission of the packets when the occupancy level of the oversubscription buffer 215 equals and/or falls below the resumption threshold 230. The packet transmission rate may first be restored to the previously reduced rate, which may then be increased when the occupancy of the oversubscription buffer equals and/or fall below the restoration threshold 224. In some implementations, multiple restoration thresholds may be used to incrementally increase the packet transmission rate as the subscription buffer occupancy decreases. In this fashion, packet loss may be avoided while latency remains at a reduced level.

Figure 3:
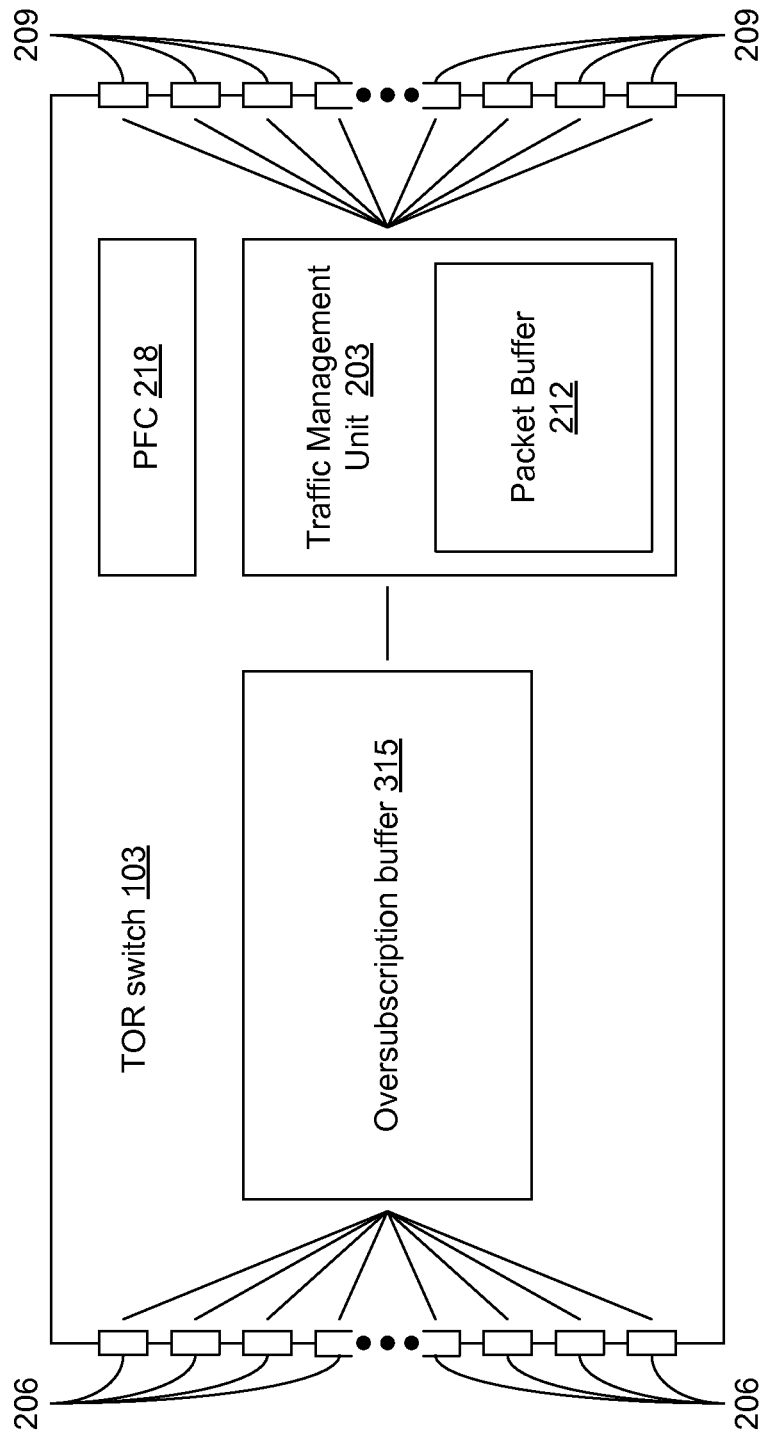

As noted above, throughput may be improved by sharing an oversubscription buffer 215 between multiple ingress ports 206. Referring to FIG. 3, shown is an example of the TOR switch 103 of FIG. 1 including a common oversubscription buffer 315 that receives packets through all ingress ports 206. Because the buffers for each ingress port 206 may be consolidated into the common oversubscription buffer 315, a larger oversubscription capacity may be provided for any one ingress port 206. Since it is unlikely that all ingress ports 206 will be simultaneously operating at a maximum packet transmission rate, the portion of the common oversubscription buffer 315 that is not being utilized may be used to handle bursts in packet transmission through other ingress ports 206.

The PFC 218 can monitor the occupancy (or utilization) level of the common oversubscription buffer 315 and may initiate adjustment of the traffic flow (e.g., an ingress packet rate) to the common oversubscription buffer 315 through the ingress ports 206 based upon the occupancy (or level of utilization) of the common oversubscription buffer 315. In response to the occupancy level, a RCM may be sent to one or more sources of the incoming packets (e.g., a link partner or a server 106) to adjust their packet transmission rate or a congestion notification marker may be configured to indicate whether congestion is or is not present. The source(s) may then respond to the RCM or congestion notification indication by adjusting their packet transmission rates based upon the RCM or congestion notification indication.

Figure 4A:
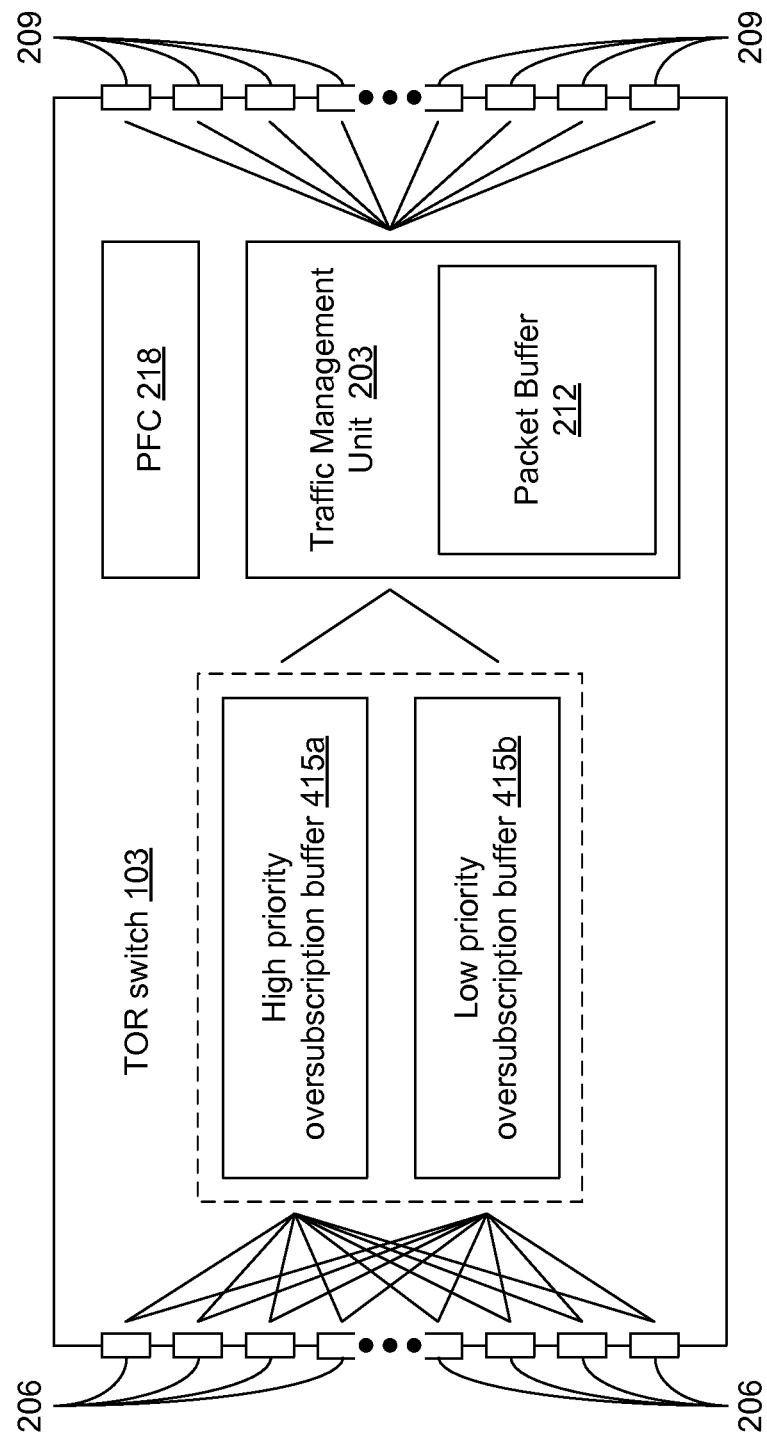
Figure 4B:
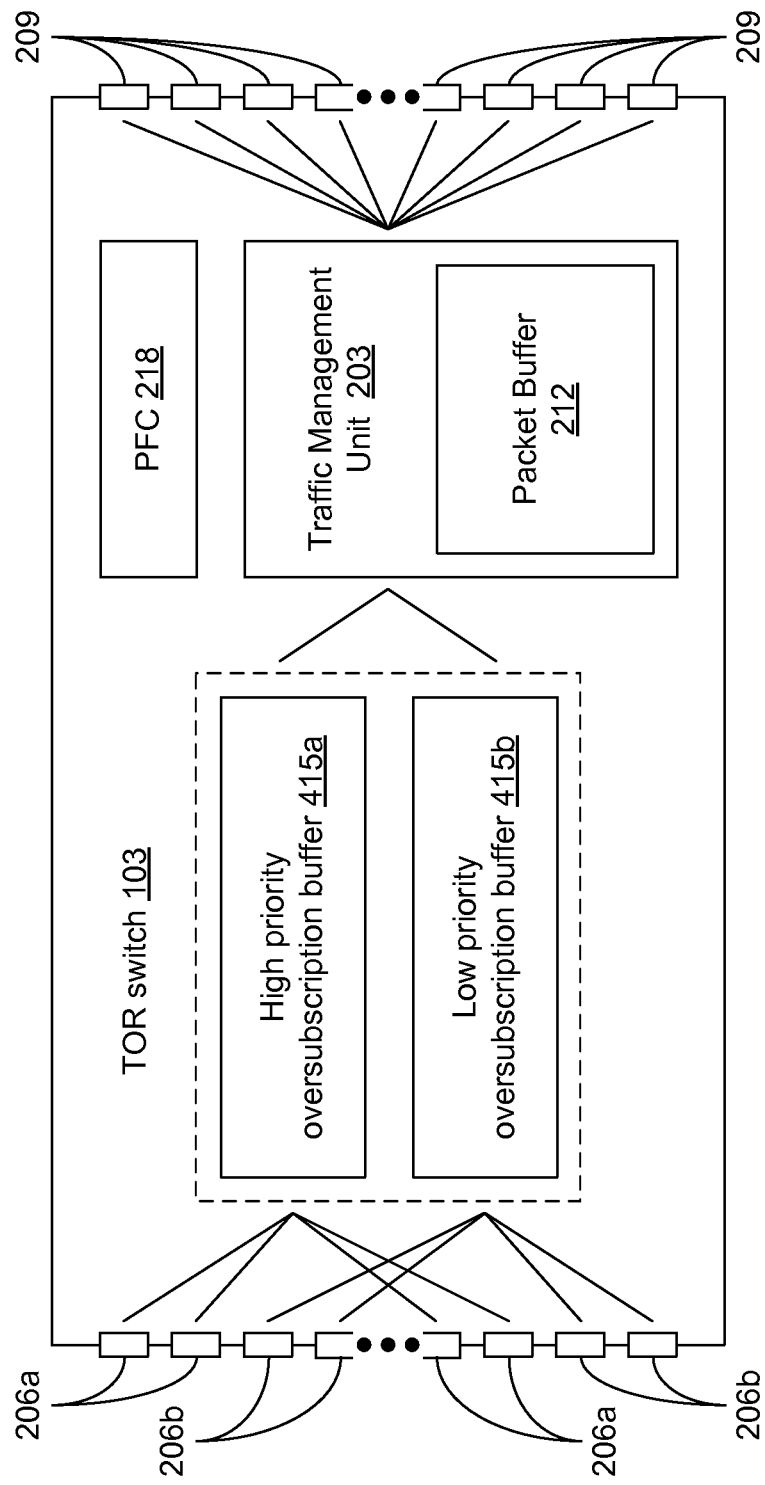

In other embodiments, the oversubscription buffer may comprise a plurality of oversubscription buffers corresponding to different packet priority levels. For example, there may be two or more oversubscription buffers with each buffer corresponding to one of a plurality of packet priority levels. Referring to FIGS. 4A and 4B, shown are graphical representations of examples of the TOR switch 103 of FIG. 1 including a high priority oversubscription buffer 415a and a low priority oversubscription buffer 415b. In the embodiment of FIG. 4A, packets from any of a plurality of ingress ports 206 may be provided to either of the high or low priority oversubscription buffers 415. Initially, the priority level of a packet received through an ingress port 206 is determined. The determination may be based upon a specification such as, e.g., IEEE 802.1p (which specifies eight priority levels for incoming packets or frames) or HG2.TC. The packet is then provided to the oversubscription buffer 415 having the corresponding packet priority level. For example, a portion of the 802.1p levels may be identified as high priority and routed to the high priority oversubscription buffer 415a and the remaining levels may be identified as low priority and routed to the low priority oversubscription buffer 415b. The high priority packets have access to all available bandwidth of the TOR switch 103, while low priority packets utilize any remaining bandwidth after servicing the high priority packets.

In some implementations, the packet priority may be defined by the ingress ports 206 through which the packets are received. As illustrated in FIG. 4B, packets received through high priority ingress ports 206a are mapped to the high priority oversubscription buffer 415a and packets received through low priority ingress ports 206b are mapped to the low priority oversubscription buffer 415b. The packets received through the high priority ingress ports 206a have access to all available bandwidth of the TOR switch 103, while the TOR switch 103 will make a best effort to service low priority packets with any excess bandwidth that remains after the high priority packets have been satisfied. This allows for a strict priority service order.

The PFC 218 monitors the occupancy (or utilization) level of the high priority oversubscription buffer 415a and may initiate adjustment of the ingress packet rate of the high priority oversubscription buffer 415a based upon the occupancy (or utilization) level of the high priority oversubscription buffer 415a. This may be accomplished by sending RCMs to one or more sources of the high priority packets or configuring congestion notifications (e.g., ECNs, FECNs, and/or QCNs) in incoming high priority packets. One or more predefined reduction threshold(s) 221 and predefined restoration threshold(s) 224 may be used to initiate adjustment of the ingress packet rate as described above. A predefined upper limit threshold 227 and a resumption threshold 230 may also be used to avoid the loss of any high priority packets. RCMs may be sent to all sources of the high priority packets associated with a high priority ingress port 206a (or pipeline) that is exhibiting a high packet rate.

In some embodiments, the occupancy (or utilization) level of the low priority oversubscription buffer 415b may not be monitored. Because of the low priority, overflow and/or packet loss of the low priority packets may be considered acceptable. In other embodiments, the low priority oversubscription buffer 415b may also be monitored by the PFC 218 to avoid congestion and reduce the loss of the low priority packets. Because the low priority packets may tolerate some packet loss, the reduction and restoration thresholds 221 and 224 for the low priority oversubscription buffer 415b may be defined at higher levels than those used for the high priority oversubscription buffer 415a. In addition, the packet transmission rate for the low priority packets may be maintained at a higher level to reduce latency at the expense of packet loss. Where there are multiple levels of priority, the oversubscription buffer 415 for each priority level may have the same or different defined levels of their corresponding reduction and restoration thresholds 221 and 224.

Figure 5:
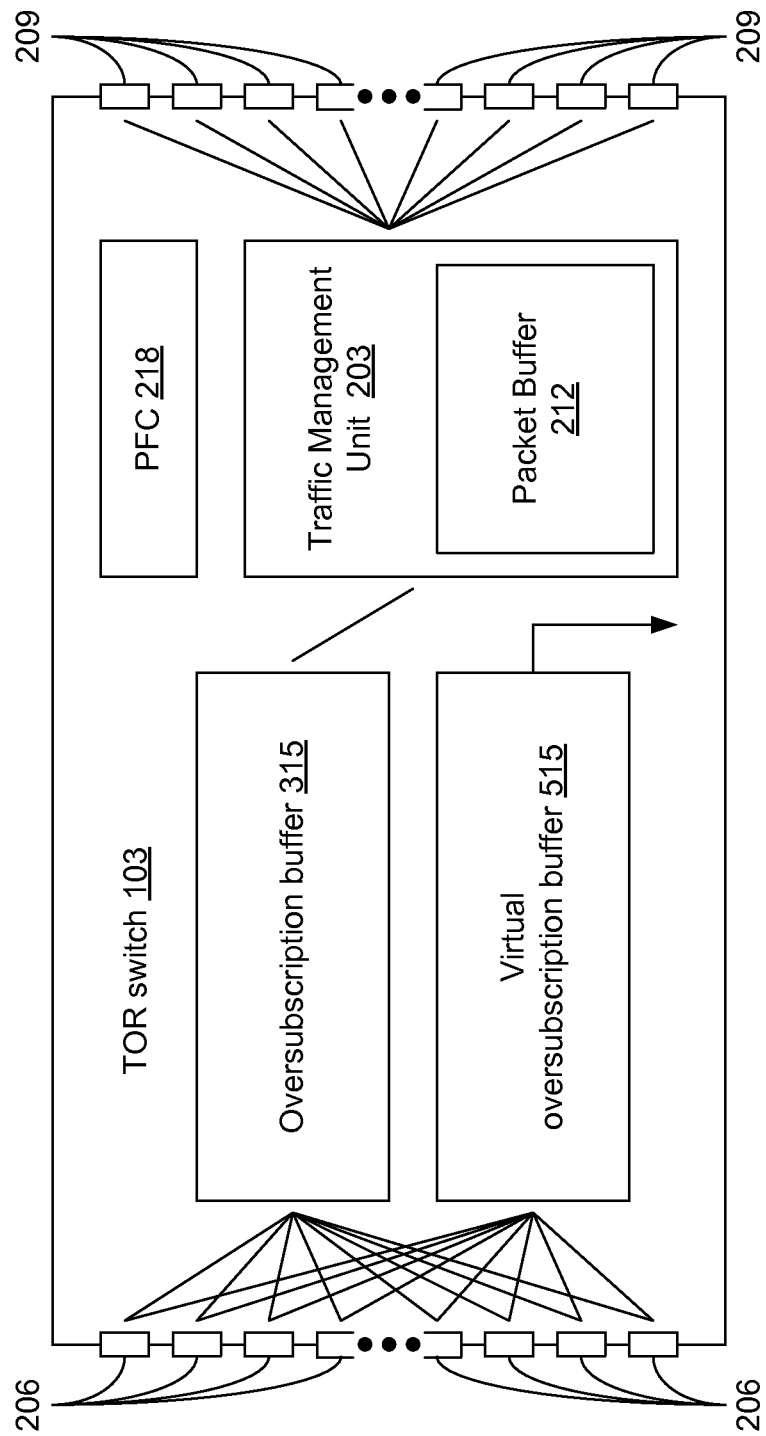

Referring next to FIG. 5, shown is a graphical representation of an example of the TOR switch 103 of FIG. 1 including a virtual subscription buffer 515 that may be used for oversubscription control. Rather than monitoring the occupancy (or utilization) level of an oversubscription buffer 215, 315, or 415, a virtual oversubscription buffer 515 may be used as a "meter" to monitor the occupancy of the corresponding oversubscription buffer 215, 315, or 415. In the example of FIG. 5, the virtual oversubscription buffer 515 corresponds to oversubscription buffer 315. A packet drain rate is defined for the virtual oversubscription buffer 515 that is less than the packet processing rate of the TOR switch 103.

As packets are provided to the oversubscription buffer 315, a copy is also provided to the virtual oversubscription buffer 515. As the packets in the oversubscription buffer 315 are provided for processing and distribution by the traffic management unit 203 at the packet processing rate, the packet copies are removed from the virtual oversubscription buffer 515 at the packet drain rate. Since the packet drain rate is less than the packet processing rate, the occupancy (or utilization) level of the virtual oversubscription buffer 515 is equal to or greater than the occupancy level of the corresponding oversubscription buffer 315. By monitoring the occupancy level of the virtual oversubscription buffer 515, the PFC 218 can initiate adjustment of the ingress packet rate based upon the occupancy level of the virtual oversubscription buffer 515 to prevent overflow of the oversubscription buffer 315. In response to the occupancy level of the virtual oversubscription buffer 515, a RCM may be sent to one or more sources of the incoming packets (e.g., a link partner or a server 106) to adjust their packet transmission rate or a congestion notification marker may be configured to indicate whether congestion is or is not present. The source(s) may then respond to the RCM or congestion notification indication by adjusting their packet transmission rates based upon the RCM or congestion notification indication.

Figure 6:
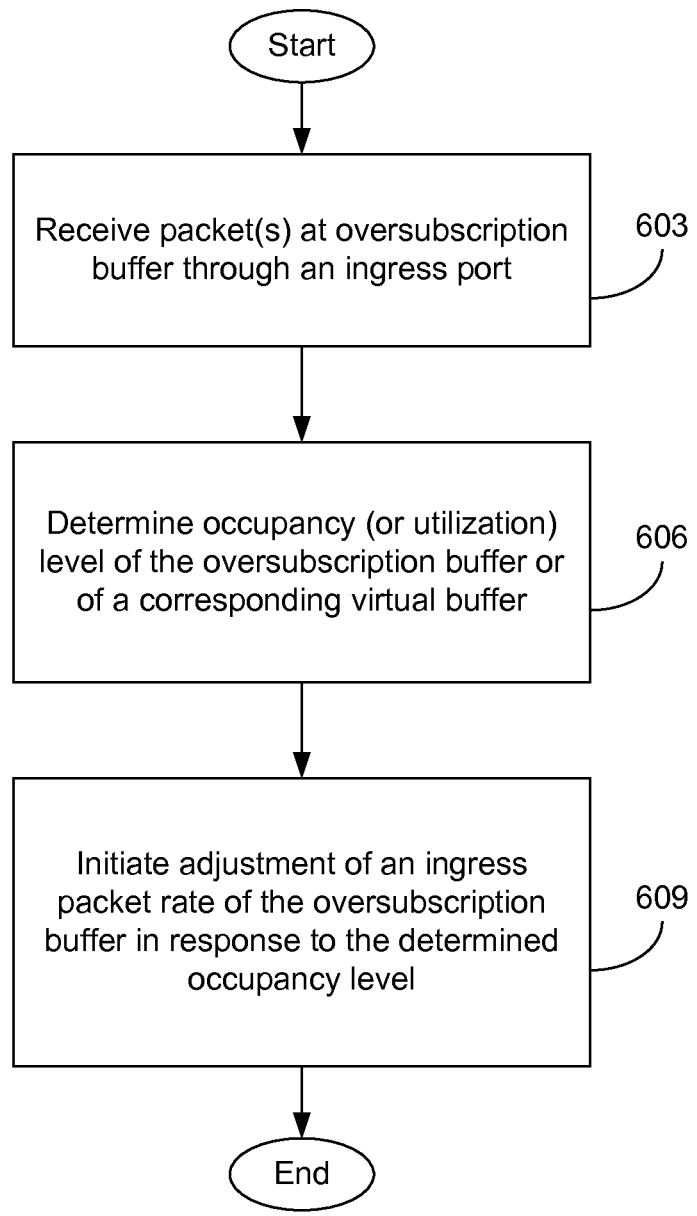
FIG. 6 is a flow chart illustrating an example of congestion control in a switch such as, e.g., the TOR switch of FIG. 1 in accordance with various embodiments of the present disclosure.

Referring to FIG. 6, shown is a flow chart illustrating an example of congestion control in a rack switch such as, e.g., the TOR switch 103 of FIG. 1. Beginning with 603, one or more packets are received by an oversubscription buffer 215, 315, or 415 through one or more ingress ports 206 of a switch such as, e.g., a TOR switch 103. In some cases, the packet is also provided to a virtual oversubscription buffer 515 corresponding to the oversubscription buffer 215, 315, or 415. The occupancy (or utilization) level of the oversubscription buffer or the corresponding virtual oversubscription buffer 515 is determined in 606. In response to the determined occupancy level, an adjustment to an ingress packet rate of the oversubscription buffer 215, 315, or 415 may be initiated in 609. For example, the determined occupancy level may be compared to a predefined threshold and a corresponding adjustment may be initiated. For instance, a congestion notification (e.g., ECN, FECN, and/or QCN) of a subsequent packet provided to the oversubscription buffer may be configured to indicate that congestion is or is not present. In some embodiments, the congestion notification may include a code that corresponds to the level of occupancy or congestion. In other cases, a RCM may be sent to one or more sources of the received packets to initiate the adjustment to the ingress packet rate.

Figure 7:
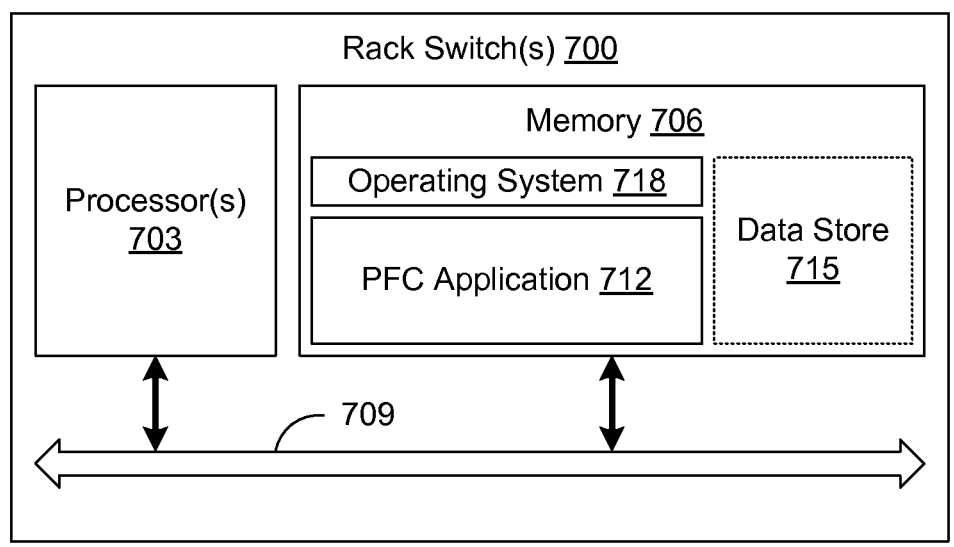
FIG. 7 is schematic block diagram of an example of a rack switch employed in the system of FIG. 1 in accordance with various embodiments of the present disclosure.

The PFC 218 of the TOR switch 103 may be implemented in hardware, firmware, software executed by a processor or other processing hardware, or any combination thereof. With reference to FIG. 7, shown is a schematic block diagram of a rack switch 700 according to various embodiments of the present disclosure. The rack switch 700 includes at least one processor circuit, for example, having a processor 703 and a memory 706, both of which are coupled to a local interface 709. To this end, the rack switch 700 may comprise, for example, at least one TOR switch 103 or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are a PFC application 712 and potentially other applications. Also stored in the memory 706 may be a data store 715 and other data. In addition, an operating system 718 may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the PFC application 712, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flow chart of FIG. 6 shows functionality and operation of an implementation of portions of a PFC application 712. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flow chart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the PFC application 712 that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for oversubscription control of a rack switch, the method comprising:
receiving a packet through one of a plurality of ingress ports of the rack switch from a source;
providing the packet to an oversubscription buffer of the rack switch that is common to the plurality of ingress ports;
providing a copy of the packet to a virtual oversubscription buffer;
monitoring an occupancy level of the virtual oversubscription buffer to determine a utilization level of the oversubscription buffer;
comparing, by circuitry of the rack switch, the occupancy level of the virtual oversubscription buffer with a utilization threshold;
configuring, by the circuitry, a congestion notification of a subsequent packet provided to the oversubscription buffer from the source when the occupancy level of the virtual oversubscription buffer is equal to or exceeds the utilization threshold;
transmitting, by the circuitry, the congestion notification to the source of the subsequent packet; and
providing, by the circuitry when the occupancy level of the virtual oversubscription buffer is equal to or exceeds the utilization threshold, the subsequent packet to a destination that is configured to transmit an acknowledgement of the subsequent packet to the source, the acknowledgement including an indication of the congestion notification, wherein the congestion notification indicates that congestion is present in the oversubscription buffer.

2. The method of claim 1, wherein the source of the subsequent packet is configured to reduce a packet transmission rate in response to the congestion notification.

3. The method of claim 1, wherein the oversubscription buffer includes a plurality of oversubscription buffers, each oversubscription buffer corresponding to one of a plurality of packet priority levels.

4. The method of dam 3, wherein the plurality of oversubscription buffers includes a high priority oversubscription buffer and a low priority oversubscription buffer.

5. The method of claim 3, further comprising: determining a packet priority level of the received packet; and providing the received packet to the oversubscription buffer corresponding to the determined packet priority level.

6. The method of claim 5, wherein the packet priority level is determined based upon traffic prioritization of IEEE 802.1p.

7. The method of claim 3, wherein the determining of the level of utilization of the oversubscription buffer comprises determining the level of utilization of the oversubscription buffer with the highest packet priority level.

8. The method of claim 7, wherein the determining of the level of utilization of the oversubscription buffer comprises determining the level of utilization of a plurality of oversubscription buffers with the highest packet priority levels.

9. A rack switch, comprising:
a plurality of ingress ports;
an oversubscription buffer configured to receive a packet from one of the plurality of ingress ports and provide the received packet for processing by the rack switch from a source; and
a packet flow control circuit configured to
provide a copy of the packet to a virtual oversubscription buffer;
monitor an occupancy level of the virtual oversubscription buffer to determine a utilization level of the oversubscription buffer;
compare the occupancy level of the virtual oversubscription buffer with a utilization threshold;

adjust an ingress packet rate of the oversubscription buffer when the occupancy level of the virtual oversubscription buffer is equal to or exceeds the utilization threshold;

transmit a congestion notification to the source when the occupancy level of the virtual oversubscription buffer is equal to or exceeds the utilization threshold; and provide, when the occupancy level of the virtual oversubscription buffer is equal to or exceeds the utilization threshold, the subsequent packet to a destination that is configured to transmit an acknowledgement of the subsequent packet to the source, the acknowledgement including an indication of the congestion notification, wherein the congestion notification indicates that congestion is present in the oversubscription buffer.

10. The rack switch of claim 9 wherein the packet flow control circuit adjusts the ingress packet rate of the oversubscription buffer by decreasing the ingress packet rate of when the occupancy level of the virtual oversubscription buffer is equal to or exceeds the utilization threshold.

11. The rack switch of claim 10, wherein the congestion notification includes a rate control message (RCM) that indicates a change in a packet transmission rate associated with the source.

12. The rack switch of claim 11, wherein the RCM includes a reduced rate for packet transmission from the source to the rack switch.

13. The rack switch of claim 9, wherein the packet flow control circuit is further configured to increase in the ingress packet rate when the occupancy level of the virtual oversubscription buffer is less than the utilization threshold.

14. The rack switch of claim 13, wherein the congestion notification includes a rate control message (RCM) that indicates a change in a packet transmission rate associated with the source.

15. A method for oversubscription control of a rack switch, the method comprising:

receiving a packet through at least one of a plurality of ingress ports of the rack switch from a source;

providing the packet to an oversubscription buffer of the rack switch;

providing a copy of the packet to a virtual oversubscription buffer associated with the oversubscription buffer, where a packet drain rate of the virtual oversubscription buffer is less than a packet processing rate of the rack switch;

monitoring an occupancy level of the virtual oversubscription buffer to determine a utilization level of the oversubscription buffer;

comparing, by circuitry of the rack switch, the occupancy level of the virtual oversubscription buffer with a utilization threshold;

adjusting, by the circuitry, an ingress packet rate of the oversubscription buffer when the occupancy level of the virtual oversubscription buffer is equal to or exceeds the utilization threshold;

transmitting, by the circuitry when the occupancy level of the virtual oversubscription buffer is equal to or exceeds the utilization threshold, a congestion notification; and providing, by the circuitry when the occupancy level of the virtual oversubscription buffer is equal to or exceeds the utilization threshold, a subsequent packet from the source to a destination that is configured to transmit an acknowledgement of the subsequent packet to the source, the acknowledgement including an indication of the congestion notification, wherein the congestion notification indicates that congestion is present in the oversubscription buffer.

16. The method of claim 15, wherein the congestion notification includes a rate control message (RCM) that indicates a change in a packet transmission rate associated with the source.

17. The method according to claim 1, further comprising: receiving a plurality of packets via the plurality of ingress ports from a plurality of sources; and transmitting, by the circuitry, the congestion notification to the plurality of sources when the occupancy level of the virtual oversubscription buffer is equal to or exceeds the utilization threshold.

18. The rack switch of claim 9, wherein the oversubscription buffer is configured to receive a plurality of packets via the plurality of ingress ports from a plurality of sources, and the packet flow control circuit is further configured to transmit the congestion notification to the plurality of sources when the occupancy level of the virtual oversubscription buffer is equal to or exceeds the utilization threshold.

19. The method according to claim 15, further comprising: receiving a plurality of packets via the plurality of ingress ports from a plurality of sources; and transmitting, by the circuitry, the congestion notification to the plurality of sources when the occupancy level of the virtual oversubscription buffer is equal to or exceeds the utilization threshold.

* * * * *

UNITED STATES PATENT AND TRADEMARK OFFICE
CERTIFICATE OF CORRECTION

PATENT NO. : 9,215,174 B2  
APPLICATION NO. : 13/802480  
DATED : December 15, 2015  
INVENTOR(S) : Bruce Kwan et al.

Page 1 of 1

It is certified that error appears in the above-identified patent and that said Letters Patent is hereby corrected as shown below:

Claims

Column 10, Claim 4, line 1, change "dam 3," to --Claim 3,--.

Column 11, Claim 10, line 1, insert --,-- after "Claim 9".

Signed and Sealed this  
Seventh Day of June, 2016

Michelle K. Lee  
*Director of the United States Patent and Trademark Office*